United States Patent [19]
Meyers

[11] 3,792,951
[45] Feb. 19, 1974

[54] APPARATUS FOR PRODUCING EXTRUDED HOLLOW BOARD

[75] Inventor: George E. Meyers, Dix Hills, N.Y.

[73] Assignee: Extrudyne, Inc., Amityville, N.Y.

[22] Filed: Jan. 24, 1972

[21] Appl. No.: 220,238

[52] U.S. Cl.................. 425/326, 425/380, 425/467
[51] Int. Cl. ............................................. B29c 1/00
[58] Field of Search ... 425/325, 380, 461, 464, 467, 425/326; 164/85

[56] References Cited
UNITED STATES PATENTS

| | | | |
|---|---|---|---|
| 1,193,663 | 8/1916 | Boyd et al. | 425/325 |
| 1,310,509 | 7/1919 | Specht | 425/464 |
| 1,500,739 | 7/1924 | Howard et al. | 425/464 X |
| 2,392,190 | 1/1946 | Ritter | 425/467 |
| 2,616,126 | 11/1952 | Merck et al. | 425/325 X |
| 3,274,315 | 9/1966 | Kawamura | 425/326 X |
| 3,538,209 | 11/1970 | Hegler | 425/380 X |

Primary Examiner—Richard B. Lazarus
Attorney, Agent, or Firm—Ostrolenk, Faber, Gerb & Soffen

[57] ABSTRACT

Hollow synthetic board which may be used to replace corrugated paper board is continuously extruded of relatively soft thermoplastic resin, such as polyolefin, by apparatus having replaceable mandrels disposed in the cavity of an extrusion die. These mandrels are fastened in operative position by hollow screws which are part of the passage means for maintaining the interior of the synthetic board at ambient pressure. After leaving the die the extrusion alternately passes through a plurality of cooling and sizing sections. In the latter a vacuum is applied to the outer surface of the board to prevent collapse thereof prior to hardening of the extrusion. Temperature within the cooling sections is regulated so that the upstream sections are warmer than the downstream sections.

10 Claims, 7 Drawing Figures

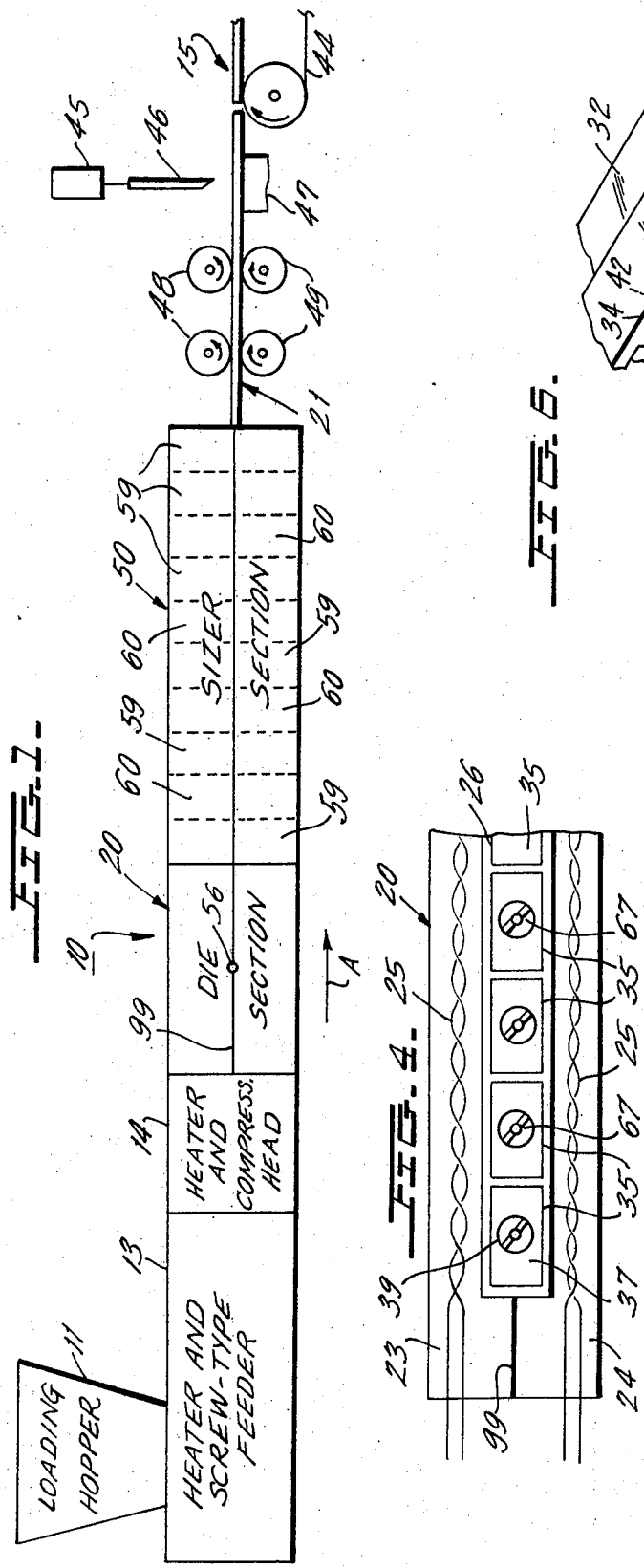
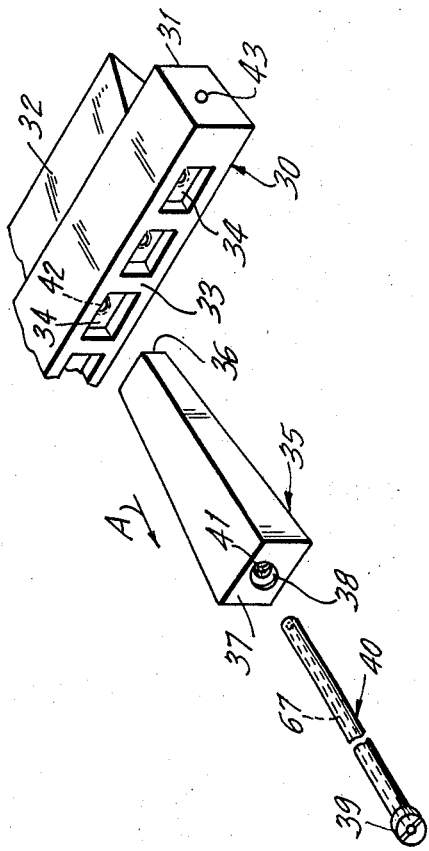
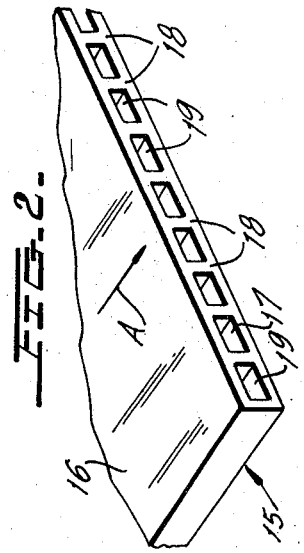

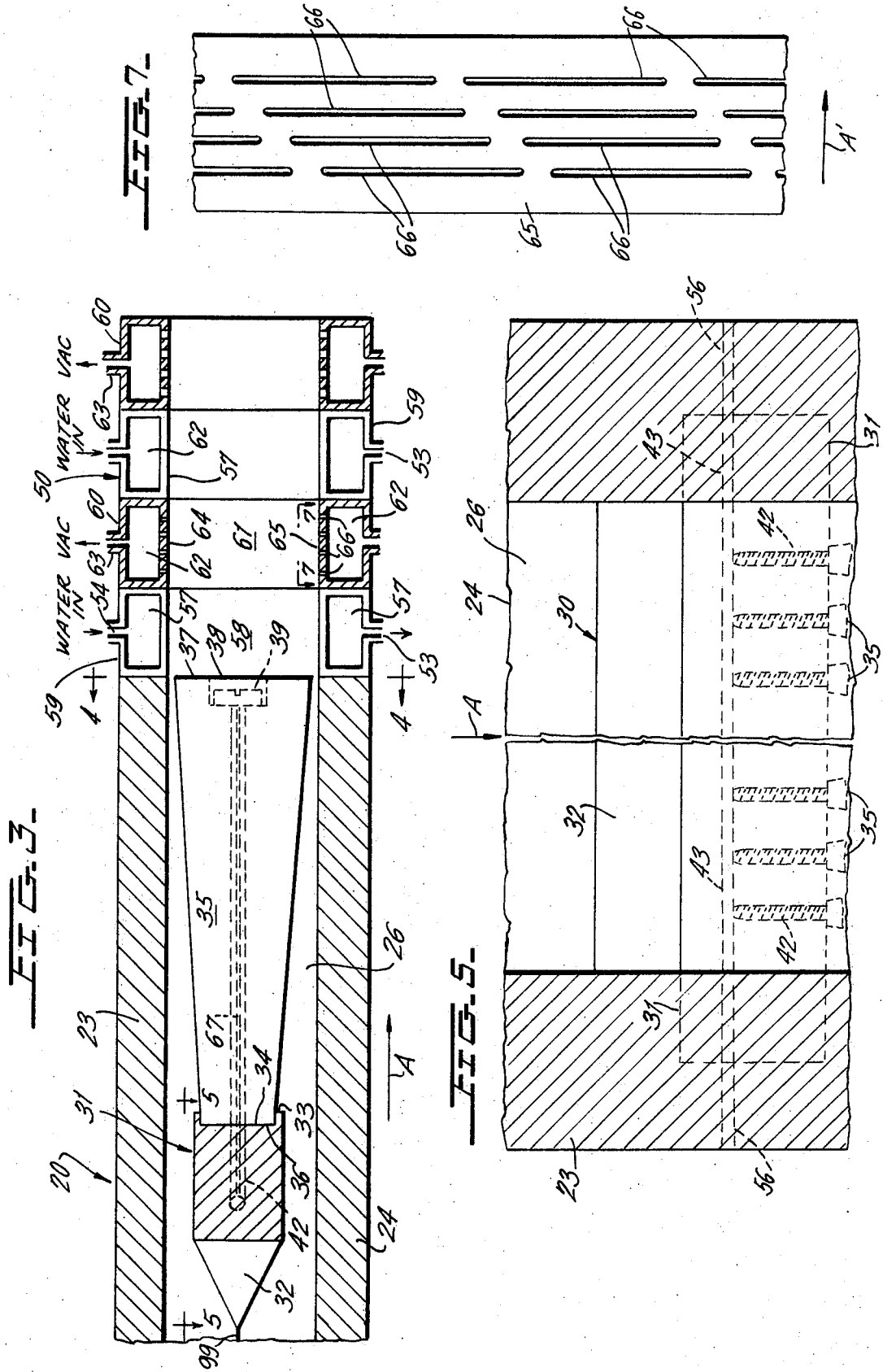

APPARATUS FOR PRODUCING EXTRUDED HOLLOW BOARD

This invention relates to extruding apparatus in general and more particularly relates to an extruder for producing hollow board from relatively soft polyolefin resin.

U. S. Pat. No. 3,274,315 issued Sept. 20, 1966, to Yuzo Kawamura entitled Process for Unitized Construction of Synthetic Resin Board or Cylinder describes apparatus for producing various embodiments of hollow synthetic resin board that may be used as a substitute for paper corrugated board. In order to produce hollow synthetic resin board having desirable strength and handling qualities, it is often desirable to utilize relatively soft thermoplastics such as polyolefins rather than a relatively hard plastic such as polyvinyl chloride. It appears that utilizing this relatively soft type of material presents certain problems, making it impractical to produce hollow synthetic resin board by utilizing equipment which the prior art had provided for producing hollow plastic forms.

Accordingly, a primary object of the instant invention is to provide novel extruding apparatus which is adapted to produce hollow board from relatively soft thermoplastics.

Another object is to provide extrusion apparatus of this type having replaceable mandrels in the die section.

Still another object is to provide apparatus of this type having a novel vacuum-cooling sizer means.

These objects as well as other objects of this invention will become readily apparent after reading the following description of the accompanying drawings in which:

FIG. 1 is a schematic side elevation of extruder apparatus constructed in accordance with teachings of the instant invention.

FIG. 2 is a fragmentary perspective illustrating synthetic resin board produced by the apparatus of FIG. 1.

FIG. 3 is a fragmentary longitudinal cross-section through part of the extruder and sizer sections of the apparatus illustrated in FIG. 1.

FIG. 4 is a fragmentary front elevation looking in the direction of arrows 4—4 of FIG. 3 of the die section.

FIG. 5 is a fragmentary cross-section taken through line 5—5 of FIG. 3.

FIG. 6 is an exploded perspective illustrating one of the replaceable mandrel elements and the elements for securing same in an operative position.

FIG. 7 is a fragmentary section taken through line 7—7 of FIG. 3.

Now referring to the figures. Extruding apparatus indicated generally by reference numeral 10 in FIG. 1 is intended to produce sheets of synthetic resin hollow board 15 (FIG. 2) from pellets of a relatively soft thermoplastic, such as polyolefin. Board 15 includes upper and lower walls 16, 17 maintained in spaced parallel relationship by closely spaced continuous longitudinally extending ribs 18 constituting the side walls of continuous chambers 19 extending parallel to the direction of movement, indicated by arrow A, of board 15 through apparatus 10. Typically, board 15 has an overall thickness of 0.125 inch, walls 16 and 17 are each 0.035 inch thick, ribs 18 are each 0.035 inch thick, the center-to-center spacing between ribs 18 is 0.200 inch, and the overall width of sheet 15 is 39 inches. Sheet 15 may be cut to any length desired from continuous extrusion 21.

Briefly, apparatus 10 includes hopper 11 which receives solid thermoplastic pellets that are directed into the barrel of a screw-type feeder where heaters (not shown) transform the pelletized material into a plastic state. Feeder 13 moves this plastic material from left to right with respect to FIG. 1, forcing it through compression head 14 and die section 20 into sizer section 50. Even though die section 20 and sizer section 50 are illustrated as being in abutting relationship, in practice these sections are usually closely spaced. The extrusion 21 exiting from the right end of sizer section 50 passes between and is engaged by pairs of puller rolls 48, 49 which deliver extrusion 21 between anvil 47 and cutoff knife 46 operated by solenoid 45. In a manner well known to the art, cutoff knife 46 and anvil 47 are mounted on a frame (not shown) which moves to the right at the same speed as extrusion 21 during the period when knife 46 cuts sheets 15 from extrusion 21. Sheets 15 are removed from the area of knife 46 by belt-type conveyor 44 or other conveyor means (not shown).

Die section 20 includes upper and lower die sections 23, 24, each having an electric heater 25. Die sections 23, 24 are secured together in face-to-face relationship along line 99, to form low-profile die cavity 26 therebetween. The cross-section of cavity 26 corresponds to the external shape of extrusion 21. Die section 23, 24 are provided with cutouts which receive complementary end extensions 31 of transverse mandrel holder 30 to secure and operatively position the latter across cavity 26. The upstream end of holder 31 is provided with a conventional tapered divider 32 that splits the plastic stream exiting from compression head 14 into portions that flow above and below holder 30.

Downstream face 33 of holder 30 is provided with a plurality of equally spaced rectangular keying recesses 34 each of which receives the upstream end of an individual elongated mandrel 35. The latter is of rectangular cross-section and tapers from end to end so that upstream face 6 is of smaller area than downstream face 37. Circular recess 38 formed in mandrel 35 adjacent face 37 houses head 39 of screw 40 that extends through a longitudinal bore 41 in mandrel 35 and is received by threaded aperture 42 in holder 31 to rigidly secure removable mandrel 35 in operative position within die cavity 26 spaced from the walls thereof. Transverse bore 43 extends through holder 30 and communicates with all threaded apertures 42 thereof, and also communicates with venting apertures 56 at opposite sides of die section 20.

Sizer section 50 includes a plurality of vacuum forming sections 60 spaced by a plurality of cooling sections 59. Each of the latter sections 59 is constructed with central passage 58 of a cross-section corresponding to the external shape of board 15. Passage 58 is surrounded by a water jacket 57 having entrance port 54 and exit port 53 for circulation of water within jacket 57.

Forming section 60 is provided with central passage 61 aligned with and of the same cross-section as passage 58. Manifold 62, connected to a vacuum source through port 63, surrounds passage 61. The major opposed surfaces 64, 65 are each provided with a plurality of extremely narrow transverse slots 66 communicating with manifold 62, so that the reduced pressure within manifold 62 causes extrusion walls 16, 17 to be forced against passage surfaces 64, 65 respectively, thereby preventing collapse of walls 16, 17 during the period when these walls are in a plastic or semi-plastic state. It is noted that the pressure within cavities 19 is maintained at ambient, since chambers 19 between walls 16, 17 communicate with ambient through the central passage 67 of mandrel-fastening screw 40, holder passage 43, and die ports 56.

It is noted that warmer water is circulated in the more upstream cooling sections 59 that in the more downstream cooling sections 59. In addition, it is noted that the more upstream forming sections 60 are provided with narrower slots 66 than are found in the more downstream shaping section 60. Typically, the width of slots 66 is in the range of from 0.005 inch to 0.030 inch.

Although there has been described a preferred embodiment of this novel invention, many variations and modifications will now become apparent to those skilled in the art. Therefore, this invention is to be limited not by the specific disclosure herein but only by the appending claims.

The embodiments of the invention in which an exclusive privilege or property is claimed are defined as follows.

1. Extrusion apparatus for producing synthetic resin board having upper and lower main walls connected together and maintained in spaced parallel relationship by a plurality of spaced longitudinally extending continuous ribs defining opposed side walls of longitudinally extending chambers in said board; said extrusion apparatus including a die having a longitudinally extending passage; feeding means for delivering resin to said die and forcing same downstream thereof through said passage; a holder secured to said die; a plurality of longitudinally extending mandrels, one for each of said chambers, disposed within said passage, held by and projecting downstream from said holder; keying means configured to enclosed a portion of each of said mandrels thereby operatively positioning said mandrels with respect to each other and to said holder to prevent relative rotation therebetween; and securing means maintaining said mandrels individually removably mounted to said holder in operative positions established by said keying means.

2. Extrusion apparatus as set forth in claim 1 in which the securing means comprises an individual screw for each of said mandrels extending along the axis thereof; each of said screws having a venting passage extending to the downstream end thereof so that said venting passages communicate with the internal chambers of the board.

3. Extrusion apparatus as set forth in claim 2 in which each of said mandrels is tapered along its length so that a downstream cross-section thereof is larger than an upstream cross-section thereof.

4. Extrusion apparatus as set forth in claim 3 in which the die includes separable sections and is provided with cutouts wherein complementary portions at opposite ends of said holder are disposed to remOvably secure the holder to said die via said cutouts.

5. Extrusion apparatus as set forth in claim 1 also including sizer means positioned downstream of the die to receive an extrusion issuing therefrom; said sizer means having a longitudinally extending passage through which the extrusion moves; said sizer means including a plurality of cooling sections and a plurality of shaping sections, with each of said sections defining a portion of said passage; a first of said shaping sections being interposed between a first and a second of said cooling sections, and said second cooling section being interposed between said first shaping section and a second of said shaping sections; each of said first and second shaping sections including a manifold adapted to be maintained at a pressure below atmosphere; each of said first and said second shaping sections including a pair of opposed surfaces adjacent the upper and lower walls of the board; said pair of opposed surfaces having aperture means communicating with said manifold whereby exterior portions of said upper and lower walls are subjected to pressure below atmosphere to prevent collapse thereof as said walls cool.

6. Extrusion apparatus as set forth in claim 5 in which said aperture means comprises slot means, said second shaping section being downstream of the first shaping section and the slot means of the second shaping section being wider than the slot means of the first shaping section.

7. Extrusion apparatus as set forth in claim 6 in which each of the first and second cooling sections includes passage means through which cooling liquid is circulated, with the cooling liquid in the first cooling section being warmer than the cooling liquid in the second cooling section.

8. Extrusion apparatus as set forth in claim 7 in which the securing means comprises an individual screw for each of said mandrels extending along the axis thereof; each of said screws having a venting passage extending to the downstream end thereof, so that said venting passages communicate with the internal chambers of the board; each of said mandrels being tapered along its length so that a downstream cross-section thereof is larger than an upstream cross-section thereof.

9. Extrusion apparatus as set forth in claim 5 in which the securing means comprises an individual screw for each of said mandrels extending along the axis thereof; each of said screws having a venting passage extending to the downstream end thereof, so that said venting passages communicate with the internal chambers of the board.

10. Extrusion apparatus as set forth in claim 9 in which each of said mandrels is tapered along its length so that a downstream cross-section thereof is larger than an upstream cross-section thereof.

* * * * *